United States Patent
Depondt et al.

(10) Patent No.: US 11,702,041 B2
(45) Date of Patent: Jul. 18, 2023

(54) WIPER BLADE, IN PARTICULAR FOR A MOTOR VEHICLE

(71) Applicant: Robert Bosch GmbH, Stuttgart (DE)

(72) Inventors: Helmut Depondt, Boutersem (BE); Steven Renckens, Hechtel-Eksel (BE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/533,290

(22) Filed: Nov. 23, 2021

(65) Prior Publication Data

US 2022/0161764 A1 May 26, 2022

(30) Foreign Application Priority Data

Nov. 25, 2020 (DE) .......................... 102020214770.1

(51) Int. Cl.
*B60S 1/40* (2006.01)

(52) U.S. Cl.
CPC .......... *B60S 1/4048* (2013.01); *B60S 1/4045* (2013.01); *B60S 2001/4051* (2013.01); *B60S 2001/4054* (2013.01)

(58) Field of Classification Search
CPC .... B60S 1/4006; B60S 1/4009; B60S 1/4016; B60S 1/4045; B60S 1/4048; B60S 1/4038; B60S 1/40; B60S 1/4083; B60S 2001/4029; B60S 2001/4032; B60S 2001/4051; B60S 2001/4054; B60S 1/42
USPC ........................................................ 15/250.32
See application file for complete search history.

(56) References Cited

U.S. PATENT DOCUMENTS

| | | | | |
|---|---|---|---|---|
| 6,000,093 A | * | 12/1999 | Charng | B60S 1/4016 15/250.32 |
| 6,658,690 B1 | * | 12/2003 | Westermann | B60S 1/4006 15/250.32 |
| 7,971,312 B2 | * | 7/2011 | Crabbe | B60S 1/38 15/250.43 |
| 2014/0068886 A1 | * | 3/2014 | Ku | B60S 1/4048 15/250.32 |

FOREIGN PATENT DOCUMENTS

| | | | |
|---|---|---|---|
| DE | 19941499 A1 | | 4/2001 |
| DE | 102012211059 | * | 1/2014 |
| DE | 102015222156 | * | 5/2017 |
| FR | 2119830 | * | 8/1972 |
| GB | 2034175 | * | 6/1980 |

OTHER PUBLICATIONS

Machine translation of description portion of German publication 102012211059 published Jan. 2014. (Year: 2014).*
Translation of description portion of German publication 102015222156, published May 2017. (Year: 2017).*

* cited by examiner

*Primary Examiner* — Gary K. Graham
(74) *Attorney, Agent, or Firm* — Michael Best & Friedrich LLP

(57) ABSTRACT

A wiper blade (10) includes a wiper strip (16) and a fastening element (18) for fastening the wiper strip (16) on a wiper arm (12). The fastening element (18) has a wall (30) which can be displaced in parallel and which can be displaced between two parallel end positions.

13 Claims, 7 Drawing Sheets

WIPER BLADE, IN PARTICULAR FOR A MOTOR VEHICLE

BACKGROUND

The invention relates to a wiper blade, in particular for a motor vehicle.

Numerous wiper blades are already known which have a wiper strip and a fastening element for fastening the wiper strip to a wiper arm. A plurality of fastening elements are here generally included in the sales pack such that the fastening element which fits the respective wiper arm can be chosen and fastened to the wiper strip. This is cumbersome and prone to errors during assembly. Furthermore, fastening elements for hook-shaped ends of wiper arms are known, for example, from DE 199 41 499 which have flexible tabs in order to obtain auto-adaptive characteristics.

SUMMARY

The wiper blade according to the invention having the features of the main claim has the advantage that, owing to a fastening element with at least one wall which can be displaced between two parallel end positions, a robust fastening element is constituted which ensures that the wiper strip is retained securely on the wiper arm.

Furthermore, advantageous developments of and improvements to the features stated in the main claim result from the measures explained in the dependent claims.

In an advantageous embodiment, the wall is at least partially retained by at least one spring element.

The wall can be displaced transversely to a longitudinal extent of the wiper strip in order to ensure secure and hence advantageous retention. In particular, the wall can be displaced transversely to a vertical axis of the wiper strip by at least 0.5 mm, preferably at least 1.5 mm, and ideally by at least 2 mm.

In a simple and cost-effective and hence advantageous embodiment, the fastening element has a body with a longitudinal extent of the body, wherein the wall is formed integrally with the body and can be displaced parallel to the body.

It is particularly advantageous hereby if the body, the spring element, and the wall are formed integrally from plastic, in particular as an injection-molded part.

For simple and therefore advantageous fastening to the wiper arm, the wall has a thrust surface.

A secure and therefore advantageous fastening is obtained by the wall being provided for support on the wiper arm.

Particularly good wiper performance is advantageously obtained by the fastening element being fastened to the wiper strip so that it can move in rotation, in particular so that it can swing back and forth.

Simple disconnection of the fastening element, despite it being securely fastened, can advantageously be obtained by a rotary locking element.

A particularly good fit on the wiper arm is advantageously obtained by two opposite walls being provided which can be displaced between two parallel end positions.

BRIEF DESCRIPTION OF THE DRAWINGS

An exemplary embodiment of the invention is illustrated in the drawings and explained in detail in the description below. In the drawings.

DETAILED DESCRIPTION

Figure 1:
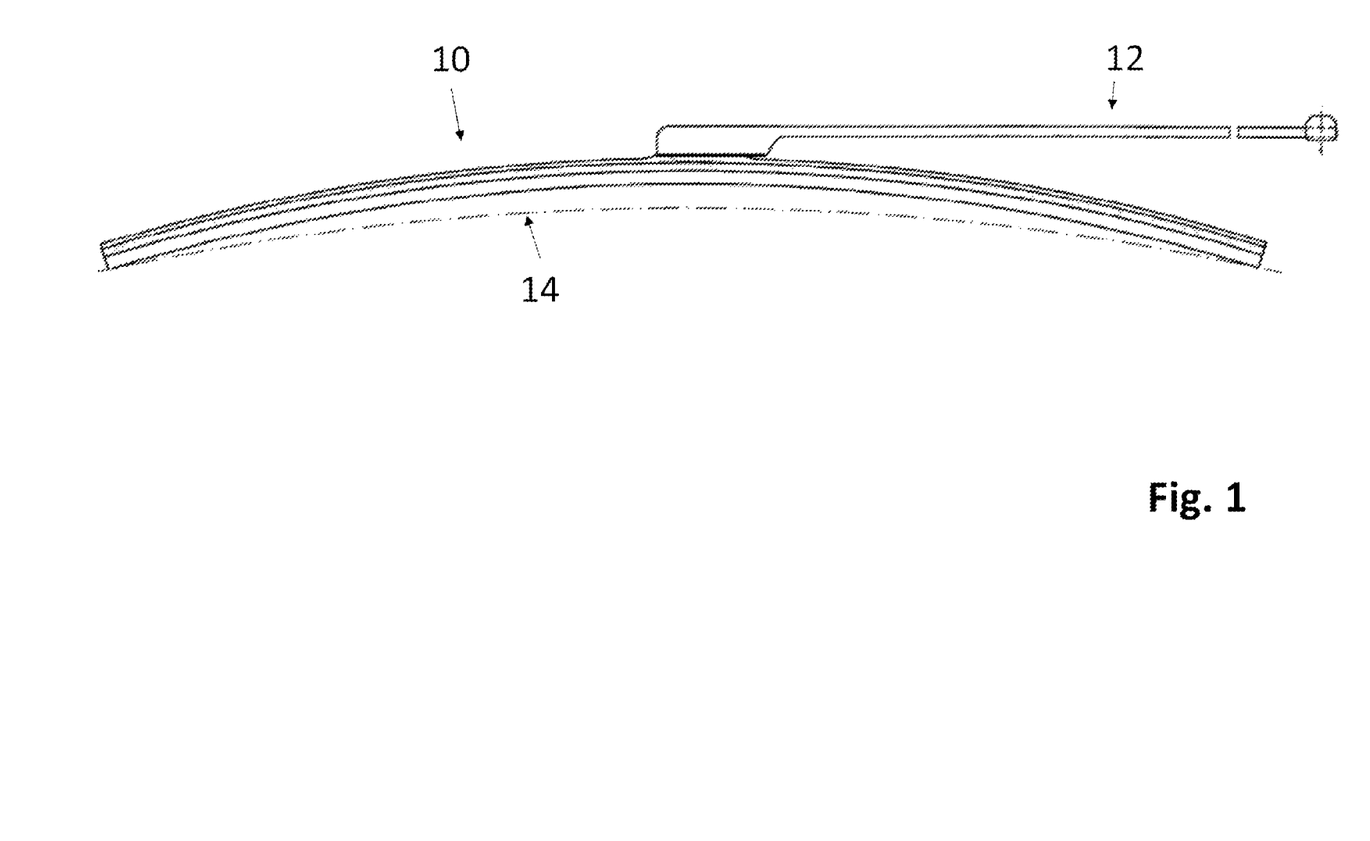
FIG. 1 shows a wiper blade according to the invention in a schematic side view.

A wiper blade 10 according to the invention is shown in FIG. 1 in a schematic side view. The wiper blade 10 according to the invention is fastened to a wiper arm 12 which can be moved in a back-and-forth swinging motion when the wiper blade 10 is operating such that the wiper blade 10 slides over a windshield 14 (shown in dashed lines here) so that moisture and dirt is wiped from the windshield 14 by the wiper blade 10.

Figure 2:
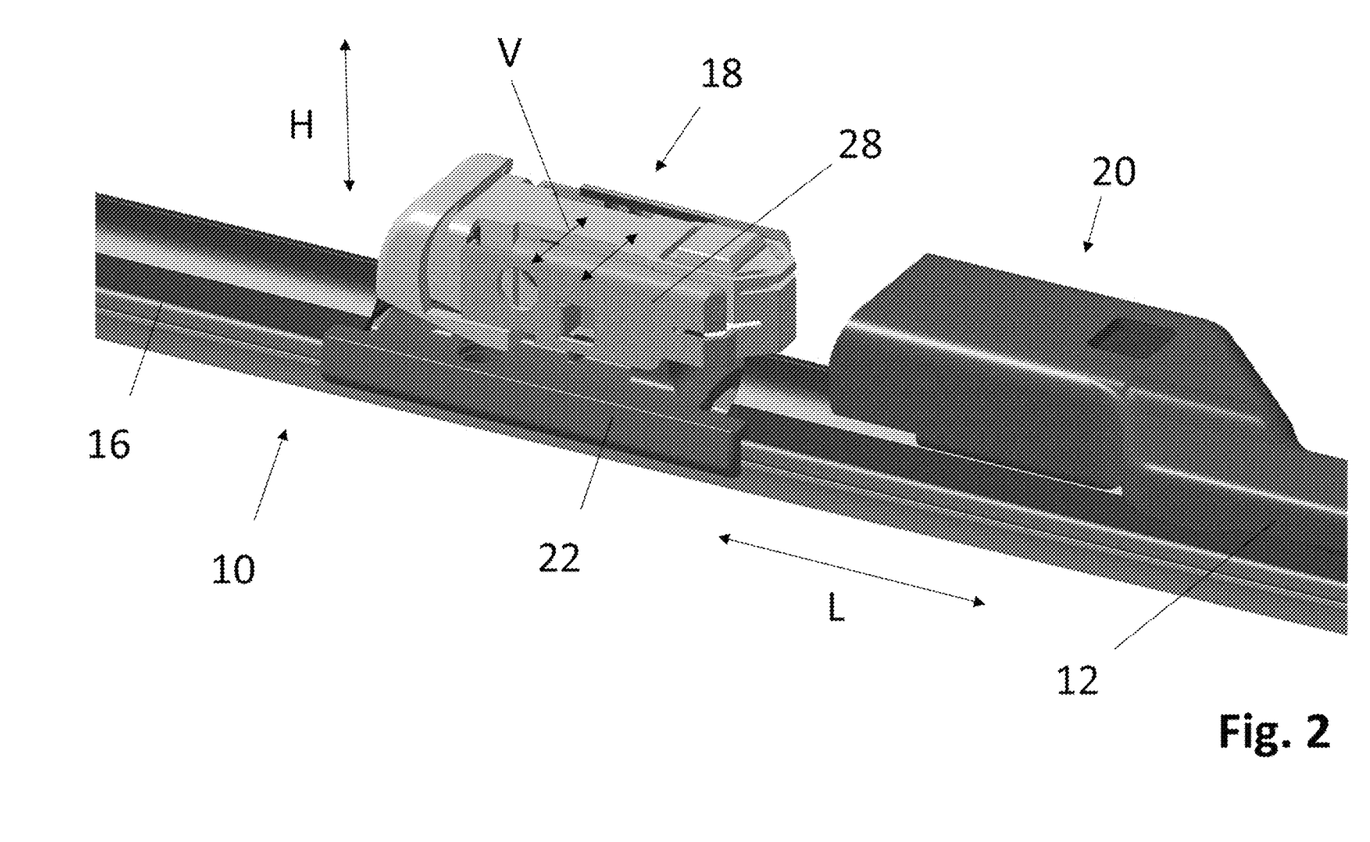
FIG. 2 shows the region of the fastening element of the wiper blade according to the invention.

The region of the wiper blade 10 according to the invention at which said wiper blade 10 is connected to the wiper arm 12 is shown in FIG. 2 in a schematic, perspective view. The wiper blade 10 according to the invention has a wiper strip 16 and a fastening element 18. During assembly, the fastening element 18 is connected to a fastening section 20 of the wiper arm 12. The fastening element 18 is hereby fastened to the wiper strip 16 so that it can swing back and forth. For this purpose, the wiper strip 16 has an intermediate part 22 on which at least one hinge bolt is provided as a first hinge element which interacts with the second hinge elements 24 (FIG. 3) of the fastening element 18. The first hinge elements have not been drawn here for the sake of clarity.

The fastening element 20 has an essentially inverted U-shape with a cover surface 26 of a first side wall 28 and a second side wall 28. The cover surface 26, the first side wall 28, and the second side wall 28 largely fit closely over the fastening element 18 in the assembled position.

For this purpose, the fastening element 18 has a wall 30 which fits closely against the side wall 28 of the fastening section 20 of the wiper arm 12 in the assembled position. As a result, manufacturing tolerances can be optimally compensated for the wiper arms 12 but wiper arms 12 of different dimensions can also be used with the same fastening element 18. For this purpose, the wall 30 is designed so that it can be displaced steplessly in parallel. The parallel displaceability is indicated here by displacement arrows V. The displaceability and hence the displacement arrows V are hereby essentially perpendicular to a longitudinal extent L of the wiper strip 16 and perpendicular with reference to a notional vertical axis H of the wiper blade 10 which runs perpendicular to the longitudinal extent L between the wiper strip 16 and the fastening element 18. The wall 30 can consequently therefore be displaced between two end positions, i.e. a first position pre-assembly on the wiper arm 12 and a second position post-assembly. The end positions are, however, essentially parallel to each other. Although tolerance-related angles between the wall 30 and the longitudinal extent L of the wiper strip 16 occur during the assembly process, the end positions of the wall 30 are essentially parallel to each other.

Figure 3:
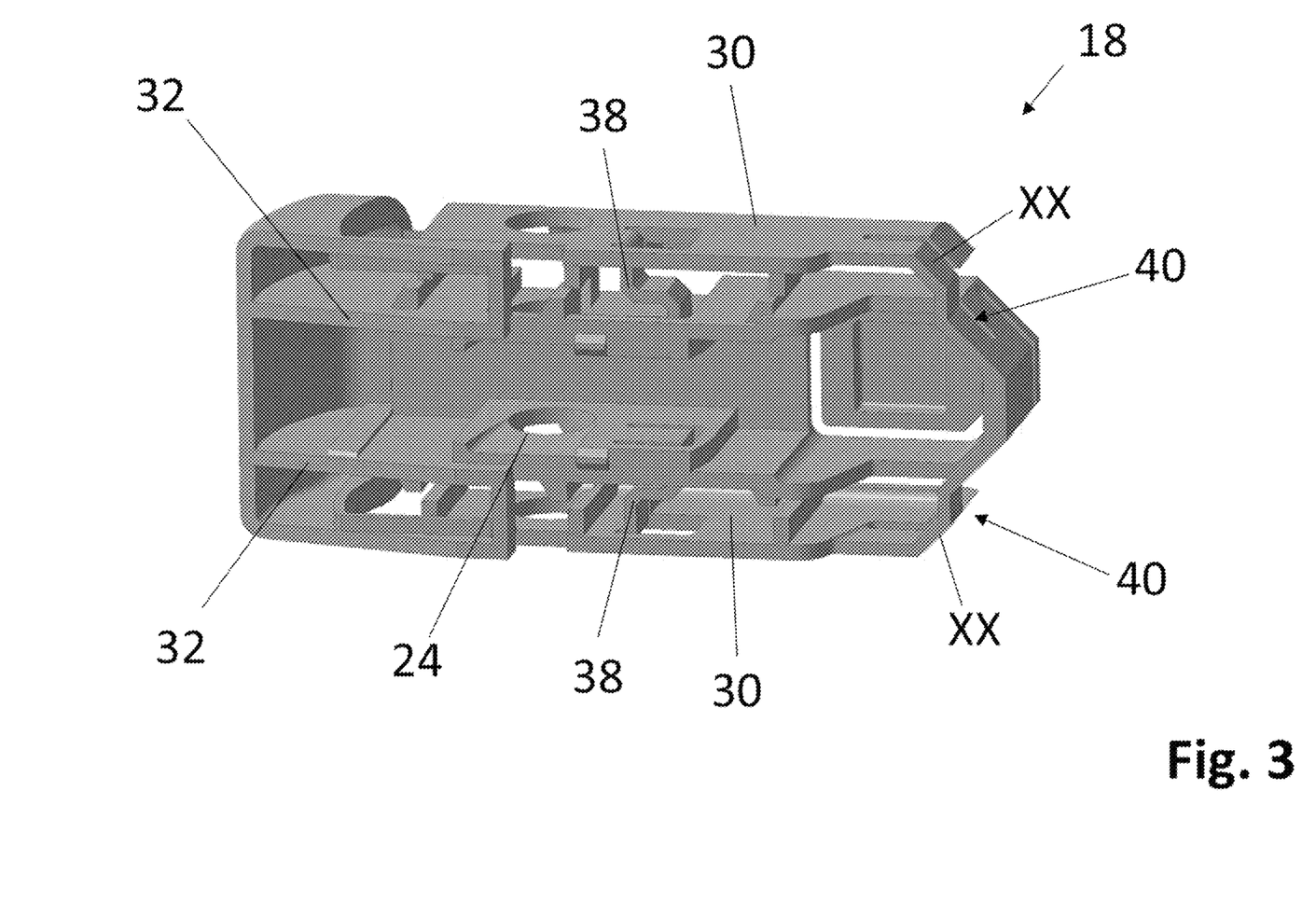
FIG. 3 shows a fastening element of a wiper blade according to the invention in a perspective view.

The fastening element 18 is illustrated in FIG. 3 in a schematic, perspective view obliquely from below, and thus as viewed from the wiper strip 16. The fastening element 18 has an essentially box-like design and has two inner walls 32 which fit closely against the intermediate part 22 in the assembled position. The inner walls 32 hereby each have an opening as a second hinge element 24 which is provided to receive the hinge bolt as a first hinge element of the intermediate part 22. Two walls 30 which can be displaced more or less in parallel are provided more or less parallel to the inner walls 32. Parallel in this sense is a displacement in which the planes of the wall which are formed in each case by the displaced wall 30 are more or less parallel to each other. In other words, the wall 30 is essentially not tilted significantly, at least less than 5°, in particular less than 3°, preferably less than 1°, such that a notional perpendicular standing on the wall 30 remains more or less constant when the plane 30 is displaced. This has the consequence that the spacing between the wall 30 and the inner wall 32 closest to it is more or less the same over the whole plane of the wall 30 during displacement. The first spring element 38 and the second spring element 40 are hereby arranged and designed such that, in the event of a parallel displacement of the wall 30, the latter is displaced somewhat in the longitudinal direction L.

The inner walls 32 are connected by a cover wall 34 on that side remote from the wiper strip 16. As a result, a body 36 which is connected to the intermediate part 22 in the assembled position is formed from the inner walls 32 and the cover wall 34. The walls 20 or the wall 30 are connected to the body 36 by first spring elements 38 and second spring elements 40 in order to produce the displaceability. However, a single spring element 38 is also in principle sufficient here. The first spring element 38 is hereby designed as an S-shaped plastic part with elastomeric properties. The second spring element 40 can also be designed in this fashion. As illustrated, bodies 36, first spring elements 38, second spring elements 40, and the walls 30 are here produced as a single piece from elastomeric plastic. The elastic spring property of the spring elements 38, 40 is achieved, on the one hand, by the shaping and, on the other hand, by the material strength.

Figure 4:
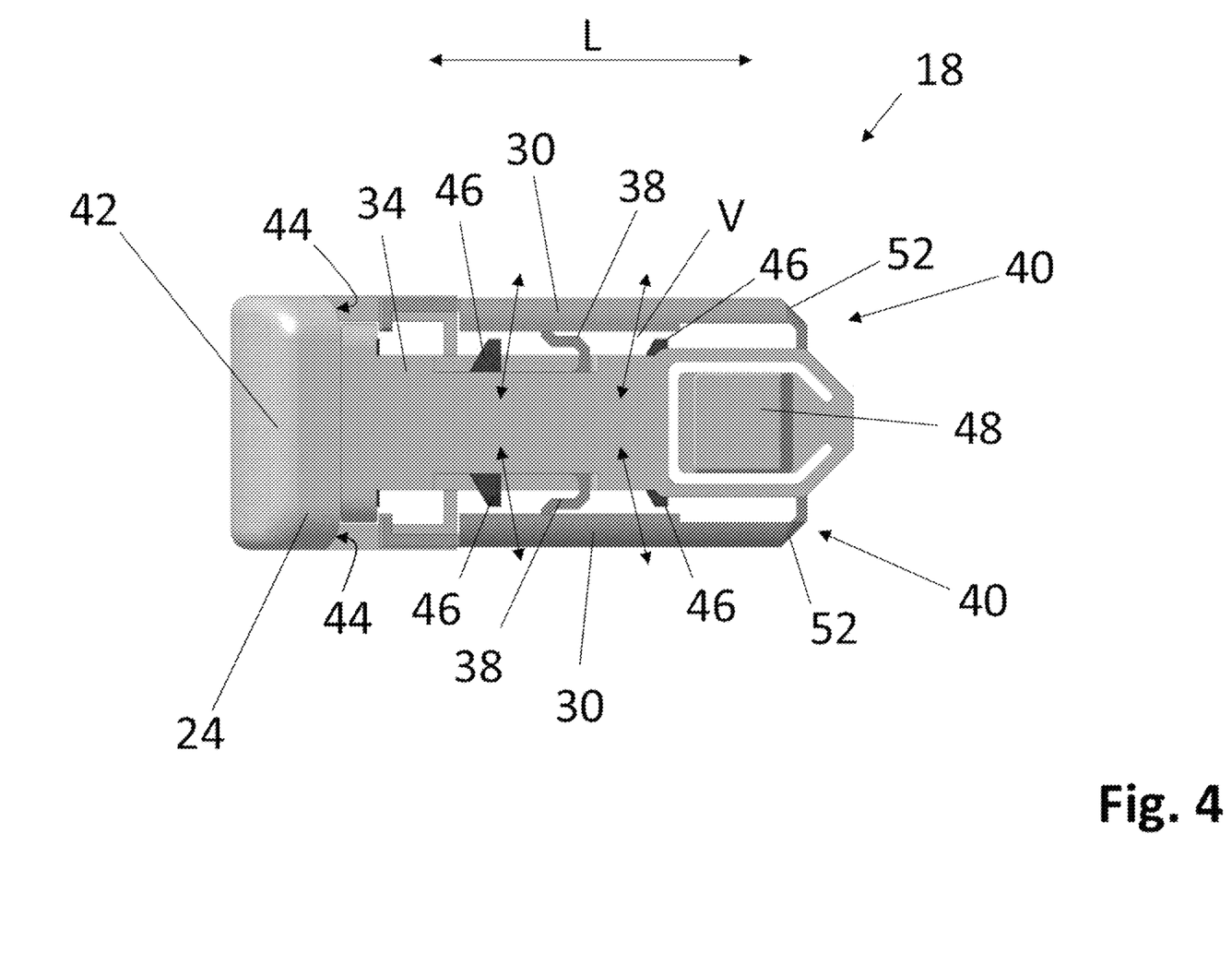
FIG. 4 shows a fastening element of a wiper blade according to the invention in a plan view.

A plan view of a fastening element 18 of a wiper blade 10 according to the invention is shown in FIG. 4 in a schematic view. The cover wall 34 and the inner walls 32, which extend from the cover wall 34, form, together with an end element, the body 36. The wall 30 runs parallel to the longitudinal extent of the body 36 of the fastening element 18. The wall 30 is connected to the body 36 by a first spring element 38 and a second spring element 40. The displaceability of the wall 30 results from the connection thereby created. If the wall 30 is therefore pressed toward the inner wall 32 adjacent to it counter to the force of the spring elements 38, 40, it is displaced somewhat in the longitudinal direction L. The displaceability is limited by at least one limiting element 46. In the example shown here, four limiting elements 46 are provided. The limiting elements 46 prevent an excessive deformation of the first spring element 38 or the second spring element 40, which could possibly cause the spring elements 38, 40 to fracture.

The end element 42 is designed as a wall-like limiting element which ends the fastening element 18 on the side remote from the wiper arm 12 in the assembled position. The end element 42 projects beyond the inner walls 32 in such a way that arm stops 44 are formed which additionally secure the wiper arm 12.

The cover wall 34 furthermore has a locking element 48. The latter comprises a tab, which is provided with a catch and is connected to the remaining cover wall 34 by a film hinge. During or after assembly of a wiper arm 12, the catch engages in a slot 50 (FIG. 5) of the wiper arm 12 such that the latter is locked in the longitudinal direction in the longitudinal extent L by the catch of the locking element 48 and the arm stops 44. The tab can be moved in rotation by means of the film hinge such that a rotary locking element 48 results. For assembly, the wiper arm 12 or the fastening element 20 of the wiper arm 12 is pushed in the direction of the longitudinal extent L onto the fastening element 18. In order to make this process easier, an obliquely inwardly extending thrust surface 52 is provided such that the fastening section 20 slides over the thrust surface 52. The wall 30 hereby fits closely against the inner wall of the fastening section 20 of the wiper arm 12, wherein the spring elements 38, 40 are compressed and press the wall 30 firmly against the inner wall of the fastening section 20.

Figure 5:
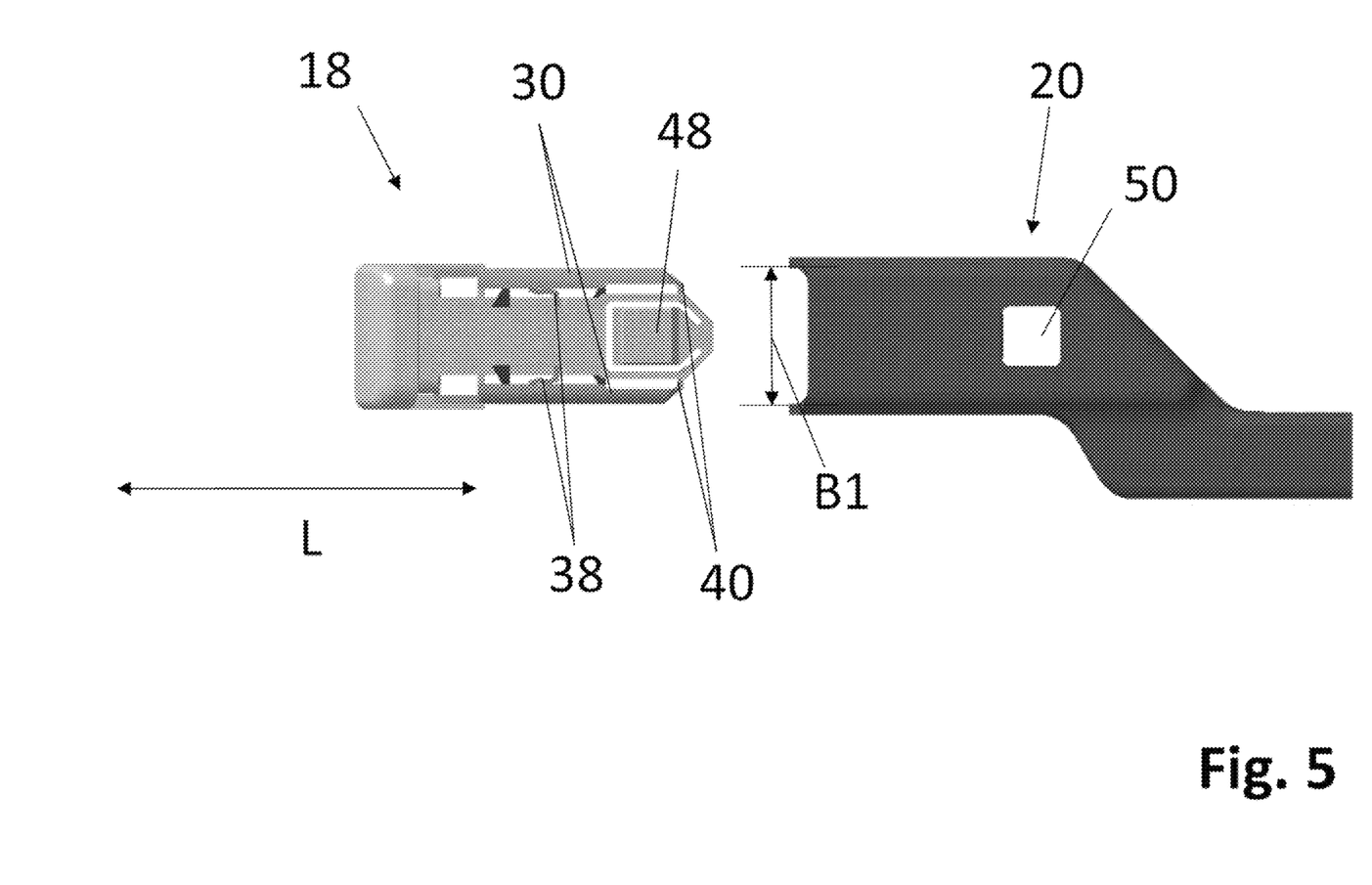
FIG. 5 shows a fastening element and an end of a wiper arm in an exploded view.

The fastening element 18 of a wiper blade 10 according to the invention is shown schematically in an exploded view in FIG. 5, next to a fastening section 20 of a wiper arm 12. During assembly, the inverted U-shaped fastening section 20 of the wiper arm 12 is pushed over the more or less box-shaped fastening element 18 in the longitudinal direction L. The spacing B1 between the two limbs of the U-shaped fastening section 20 is approximately 19 mm on the inside of the U shape. The fastening element 18 here has a mirror-symmetrical design such that two walls 30 are provided. When the fastening element 18 is pushed in, its walls 30 which can be displaced steplessly in parallel fit closely against the inner walls of the fastening section 20, wherein the first spring element 38 and the second spring element 40 are lightly tensioned. As in the preceding example, the rotary locking element 48 is designed as an elastic tab with a catch and slides along the cover surface 26 of the fastening section 20 until the catch engages in the slot 50 which is arranged in the cover surface 26 of the fastening section 20.

Figure 6:
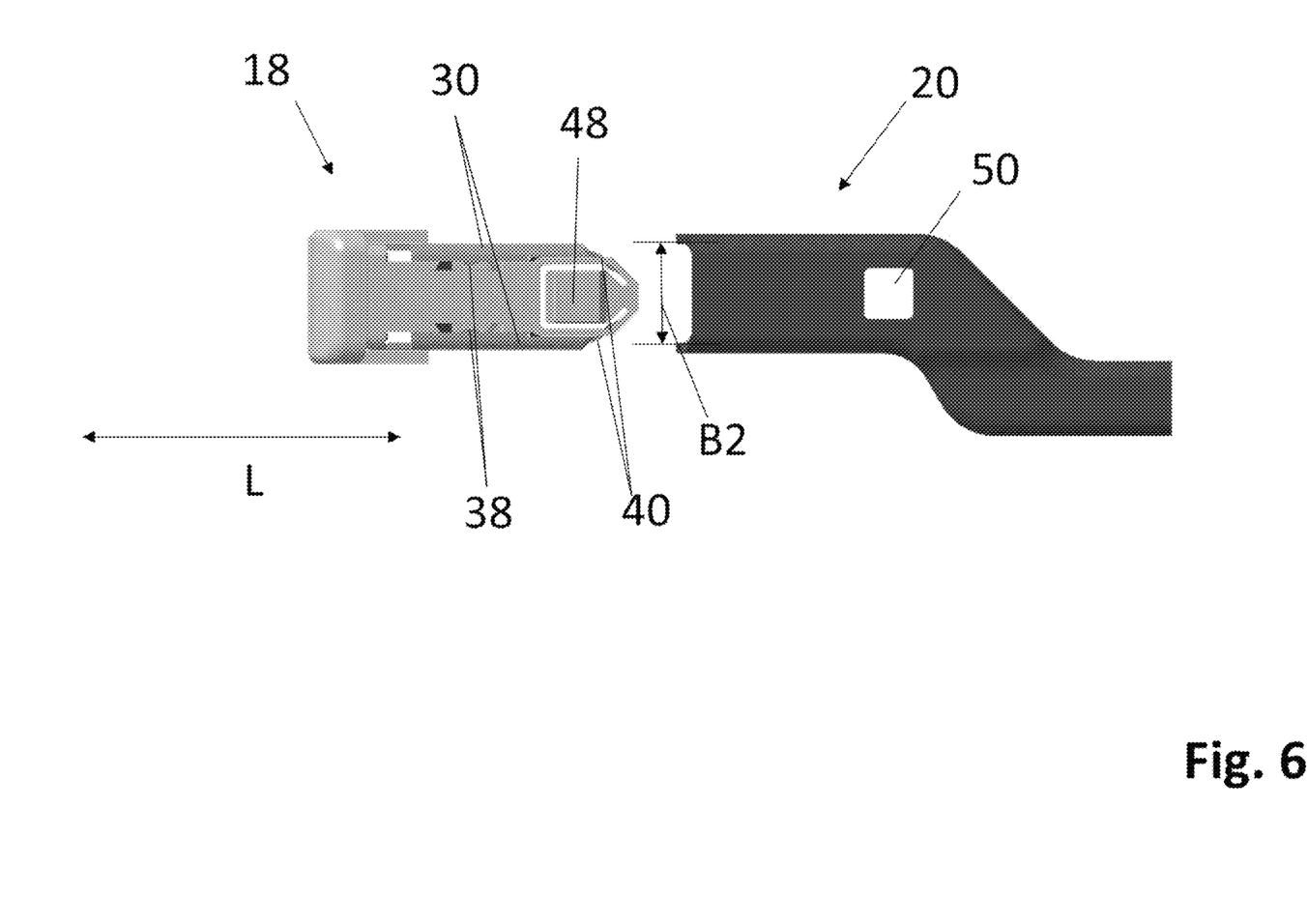
FIG. 6 shows a further fastening element and an end of a further wiper arm in an exploded view.

The fastening element 18 of a wiper blade 10 according to the invention is shown schematically in an exploded view in FIG. 6, next to a further fastening section 20 of a wiper arm 12. Because the fastening element 18 is identical to that in FIG. 5, the explanations for FIG. 5 correspondingly also apply here. The two limbs of the U-shaped fastening element 20 of the wiper arm 12 here have a spacing B2 of approximately 16 mm. The walls 30 are therefore displaced in parallel inward toward the body 36 or the respective adjacent inner wall 32, and the spring elements 38, 40 are therefore compressed. The spring elements 38, 40 carried by the walls 30 therefore press the walls 30 toward the limb of the fastening section 20 such that the fastening part 18 is securely retained.

Figure 7:
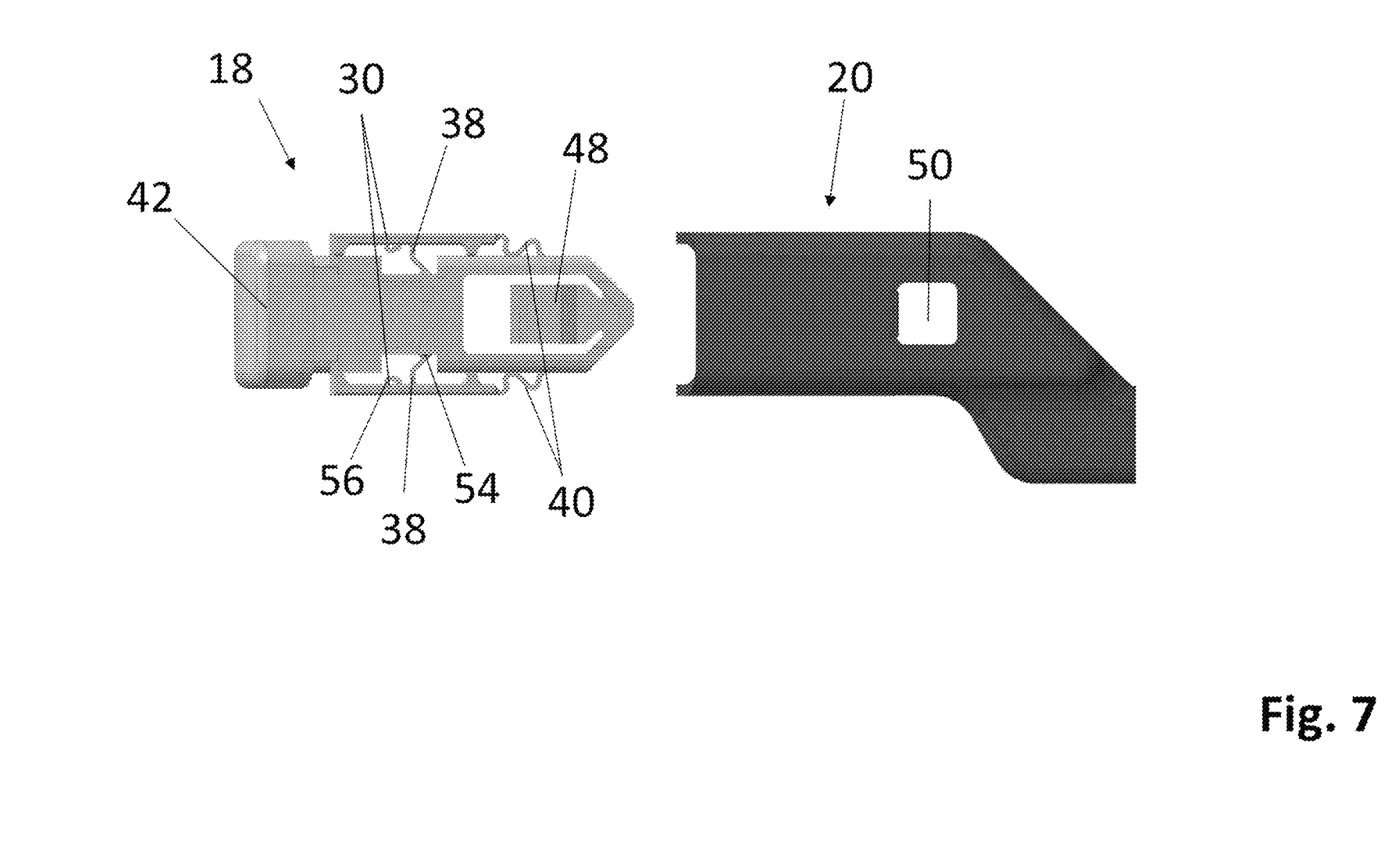
FIG. 7 shows a fastening element of a wiper arm according to the invention in a variation.

A variation of the fastening element 18 is illustrated in FIG. 7. The first spring element 38 and the second spring element 40 are not S-shaped and instead are wavy. An improved spring property consequently results.

In all the exemplary embodiments, the spring elements 38, 40 have a spring base 54, connected to the body 36, and a spring end 56 connected to the wall 30. This is shown in FIG. 7 for just one spring element 38 but it applies to all four spring elements 38, 40 shown.

In all the exemplary embodiments, in order to assist the parallel displacement, the spring base 54 is the same distance away, or further, from the end element 42 as the spring end 56. The spacing between the spring end 56 and the end element 42 is therefore less than or the same as the spacing between the end element 42 and the spring base 54.

As shown here, the fastening element 18 can be produced as a single piece from plastic in an injection-molding process. A multi-part design is, however, also possible. In particular, the wall 30 or the walls 30 can be fastened to the body 36 by helical springs. In a further variation, only a single spring element 38 can be provided instead of the first spring element 38 and the second spring element 40. This can also be further assisted by a suitable guide means. It is hereby possible, for example, for the second spring element 40 to be replaced by a linear guide means, for example a tongue-and-groove guide means.

The invention claimed is:

1. A wiper blade (10) comprising a wiper strip (16) and a fastening element (18) for fastening the wiper strip (16) on a wiper arm (12), characterized in that the fastening element (18) has a body (36) and first and second walls (30), each being configured to be translated relative to the body (36) between a first position and a second position, wherein the orientation of the walls (30) in the first position is parallel to the orientation of the walls (30) in the second position, wherein the body (36) and the walls (30) are integrally formed as a single piece component, wherein the first wall (30) and the second wall (30) are opposite walls (30) which are configured to be displaced in parallel relative to one another, and can each be displaced between two parallel end positions.

2. The wiper blade (10) according to claim 1, characterized in that the walls (30) are at least partially retained to the body (36) by a spring element (38, 40) and movable toward the body (36) against a bias of the relative spring elements (38, 40).

3. The wiper blade (10) according to claim 2, characterized in that the body (36), the spring elements (38, 40), and the walls (30) are formed integrally from plastic.

4. The wiper blade (10) according to claim 3, characterized in that the body (36), the spring elements (38, 40), and the walls (30) are formed integrally as an injection-molded part.

5. The wiper blade (10) according to claim 1, characterized in that the walls (30) are configured to be displaced transversely to a longitudinal extent (L1) of the wiper strip (16) and transversely to a vertical axis (H) of the wiper strip (16) by at least 0.5 mm from the first position to the second position.

6. The wiper blade (10) according to claim 5, characterized in that the walls (30) are configured to be displaced transversely to the longitudinal extent (L1) of the wiper strip (16) and transversely to the vertical axis (H) of the wiper strip (16) by at least 1.5 mm.

7. The wiper blade (10) according to claim 6, characterized in that the walls (30) are configured to be displaced transversely to the longitudinal extent (L1) of the wiper strip (16) and transversely to the vertical axis (H) of the wiper strip (16) by at least 2 mm.

8. The wiper blade (10) according to claim 1, characterized in that the body (36) of the fastening element (16) has a longitudinal extent of the body, and the walls (30) are formed integrally with the body (36), and the walls (30) extends parallel to a longitudinal extent of the body (36).

9. The wiper blade (10) according to claim 1, characterized in that the walls (30) have a thrust surface (52).

10. The wiper blade (10) according to claim 1, characterized in that the walls (30) are provided for support on the wiper arm (12).

11. The wiper blade (10) according to claim 1, characterized in that the fastening element (18) is fastened to the wiper strip (16) so that the wiper strip (16) can move in rotation and swing back and forth.

12. The wiper blade (10) according to claim 1, characterized in that a rotary locking element (48) is provided on the fastening element (18).

13. A wiper blade (10) comprising a wiper strip (16) and a fastening element (18) for fastening the wiper strip (16) on a wiper arm (12), characterized in that the fastening element (18) has a body (36) and a wall (30) configured to be translated relative to the body (36) between a first position and a second position, wherein the orientation of the wall (30) in the first position is parallel to the orientation of the wall (30) in the second position, wherein the body (36) and the wall (30) are integrally formed as a single piece component, characterized in that the fastening element (18) is fastened to the wiper strip (16) so that the wiper strip (16) can move in rotation and swing back and forth relative to the fastening element.

* * * * *